United States Patent [19]

Fukui

[11] Patent Number: 6,131,119
[45] Date of Patent: Oct. 10, 2000

[54] AUTOMATIC CONFIGURATION SYSTEM FOR MAPPING NODE ADDRESSES WITHIN A BUS STRUCTURE TO THEIR PHYSICAL LOCATION

[75] Inventor: Toshiharu Fukui, Newport Beach, Calif.

[73] Assignees: Sony Corporation, Tokyo, Japan; Sony Trans Com, Inc., Irvine, Calif.

[21] Appl. No.: 08/831,063

[22] Filed: Apr. 1, 1997

[51] Int. Cl.[7] .................................................. G06F 11/30
[52] U.S. Cl. .......................................... 709/224; 709/227
[58] Field of Search ........................... 395/200.51, 200.5; 709/221, 220, 224, 227

[56] References Cited

U.S. PATENT DOCUMENTS

| | | | |
|---|---|---|---|
| 5,261,044 | 11/1993 | Dev et al. | 345/357 |
| 5,289,460 | 2/1994 | Drake, Jr. et al. | 370/245 |
| 5,394,556 | 2/1995 | Oprescu | 709/220 |
| 5,420,985 | 5/1995 | Cantrell et al. | 710/113 |
| 5,434,860 | 7/1995 | Riddle | 370/232 |
| 5,471,474 | 11/1995 | Grobicki et al. | 370/437 |
| 5,537,104 | 7/1996 | Van Dort et al. | 340/825.52 |
| 5,563,886 | 10/1996 | Kawamura et al. | 370/257 |
| 5,579,486 | 11/1996 | Oprescu et al. | 710/107 |
| 5,602,841 | 2/1997 | Lebizay et al. | 370/413 |
| 5,606,664 | 2/1997 | Brown et al. | 709/224 |
| 5,615,404 | 3/1997 | Knoll et al. | 710/62 |
| 5,623,610 | 4/1997 | Knoll et al. | 710/101 |
| 5,630,173 | 5/1997 | Oprescur | 710/40 |
| 5,664,107 | 9/1997 | Chatwani et al. | 709/224 |
| 5,684,959 | 11/1997 | Bhat et al. | 709/224 |
| 5,687,319 | 11/1997 | Cook et al. | 370/256 |
| 5,689,244 | 11/1997 | Iijima et al. | 340/825.07 |

(List continued on next page.)

OTHER PUBLICATIONS

Gary Hoffman et al.; IEEE 1394: A Ubiquitous Bus; Compcon '95, Technologies for the Information Superhighway, Digest of Papers; pp. 334–338, Mar. 1995.

Stephen Diamond; IEEE 1394: Status and Growth Path; IEEE Micro; vol. 16, Issue 3; pp. 75–78, Jun. 1996.

"A Bus on a Diet –The Serial Bus Alternative, An Introduction to the P1394 High Performance Serial Bus," Michael Teener, IEEE, Feb. 24, 1992, pp. 316–321.

"Design and Analysis of Arbitration Protocols," Fayer El Guibaly, IEEE Transactions on Computers, vol. 38, Feb. 3, 1989, pp. 161–171.

"Fair Arbitration Protocols For Communication Networks," Fayez Guibaly, Victoria, B.C.

"P1394 Standard for a High Performance Serial Bus," IEEE Standards Department, Piscataway, New Jersey, Jul. 7, 1995.

"The IEEE–1394 High Speed Serial Bus," R.H.J. Bloks, Philips Journal of Research, vol. 50, No 1/2, pp. 209–216.

*Primary Examiner*—Zarni Maung
*Assistant Examiner*—Kenneth R. Coulter
*Attorney, Agent, or Firm*—Haverstock & Owens LLP

[57] ABSTRACT

An automatic configuration system maps a device address of each node coupled to a bus structure to a network protocol address corresponding to the physical location of the node. A configuration database is built which includes the network protocol address of each node and its corresponding device address. A wiring database, including each device position within the network, is maintained within a network server. Preferably, the network is an IEEE 1394 serial bus network. A topology map, including the device addresses of the nodes within the network and their relationship to each other, is generated during a self-ID sequence and is maintained by the network server. This information is then compared to the wiring database by the network server in order to build a restored topology map including the corresponding device address for each device at each position. A DHCP database is then generated which includes each device address and its corresponding network protocol address. The network protocol address corresponds to the position of the respective device. Using the DHCP database, the network protocol address is maintained for the devices at each position, in order to monitor the positions of the devices and communications from the devices.

42 Claims, 9 Drawing Sheets

U.S. PATENT DOCUMENTS

| | | | |
|---|---|---|---|
| 5,706,440 | 1/1998 | Compliment et al. | 709/224 |
| 5,715,475 | 2/1998 | Munson et al. | 710/10 |
| 5,717,878 | 2/1998 | Sannino | 345/327 |
| 5,719,942 | 2/1998 | Aldred et al. | 709/228 |
| 5,724,517 | 3/1998 | Cook et al. | 709/227 |
| 5,727,157 | 3/1998 | Orr et al. | 709/224 |
| 5,729,685 | 3/1998 | Chatwani et al. | 709/224 |
| 5,734,824 | 3/1998 | Choi | 709/224 |
| 5,737,319 | 4/1998 | Croslin et al. | 370/255 |
| 5,742,847 | 4/1998 | Knoll et al. | 710/46 |
| 5,751,967 | 5/1998 | Raab et al. | 395/200.58 |
| 5,754,789 | 5/1998 | Nowatzyk et al. | 709/233 |
| 5,764,930 | 6/1998 | Staats | 710/107 |
| 5,815,082 | 9/1998 | Welmer | 340/825.07 |
| 5,828,899 | 10/1998 | Richard et al. | 710/8 |
| 5,848,367 | 12/1998 | Lotocky et al. | 701/36 |
| 5,923,673 | 7/1999 | Henrikson | 714/712 |
| 5,973,722 | 11/1999 | Wakai et al. | 348/8 |
| 5,991,520 | 11/1999 | Smyers et al. | 710/100 |

N.C.: NON CONNECTION

AUTOMATIC CONFIGURATION SYSTEM FOR MAPPING NODE ADDRESSES WITHIN A BUS STRUCTURE TO THEIR PHYSICAL LOCATION

FIELD OF THE INVENTION

The present invention relates to the field of configuration of nodes within a bus structure. More particularly, the present invention relates to the field of automatic configuration of node addresses within a bus structure.

BACKGROUND OF THE INVENTION

The IEEE standard, "P1394 Standard For A High Performance Serial Bus," Draft 8.0v2, Jul. 7, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure.

Each node on the IEEE 1394 bus structure has a 16 bit node ID. The node ID is the address that is used for data transmission on the data link layer. This allows address space for potentially up to 64K nodes on the bus structure. The node ID is divided into two smaller fields: the higher order 10 bits specify a bus ID and the lower order 6 bits specify a physical ID. The bus ID is assigned by a root node and the physical ID is assigned during a self identify sequence upon reset of the bus. Each physical ID field is unique in a single IEEE 1394 bus, but the physical ID field is not a fixed value for each node itself. The physical ID field is fixed for the position of the node. If a device is moved from one position in the IEEE 1394 bus to another position within the same IEEE 1394 bus, the device will have a different node ID because its physical ID will have a different value when in the new position.

Within each of the bus ID and physical ID fields a value of all logical "1"s is reserved for special purposes. Accordingly, this addressing scheme provides for up to 1023 busses, each with 63 independently addressable nodes. Each IEEE 1394 compatible device includes a node unique ID which is a 64 bit number saved within a configuration read-only memory (ROM) of the device. The node unique ID is permanent for each device and does not depend on the position of the device within an IEEE 1394 bus. The node unique ID is not used for addressing of data transmissions on the data link layer.

IEEE 1394 serial bus and other complex networks, although necessary in many environments, are very complex and difficult to maintain. It is desirable in such networks to have the ability to automatically configure and maintain a mapping of the devices within the network and their corresponding physical positions. For example, within an in-flight entertainment system implemented on an aircraft, it is likely that the airline responsible for the aircraft will periodically reconfigure the layout of the cabin or remove and replace seats and equipment within the cabin. In such instances, it is desirable for the in-flight entertainment system to have the ability to automatically map the devices to their corresponding physical position within the aircraft. Without this automatic configuration ability, this map or database of the devices to their physical position would have to be manually maintained and updated after installation of the system and when devices within the system are replaced or reconfigured. This type of manual method is labor intensive and will be subject to human error. Having the ability for the network to automatically map the devices to their physical position will reduce the possibility of this human error, allow flexibility for platform configuration changes and minimize the downtime of the network.

Including a database within the network which automatically maps devices to their corresponding physical location will also make it easy to complete device specific or user specific billing, easy to block service or types of services to particular devices and easy to personalize service to specific devices and users. Automatically maintaining such a configuration database also makes it easy to display the network configuration and topology of the devices for the use of both attendant and maintenance personnel.

SUMMARY OF THE INVENTION

An automatic configuration system maps a device address of each node coupled to a bus structure to a network protocol address corresponding to the physical location of the node. A configuration database is built which includes the network protocol address of each node and its corresponding device address.

The preferred embodiment of the automatic configuration system is implemented within an in-flight entertainment system. Passengers access this in-flight entertainment system, from their seats, using passenger sets of seat peripherals. The passenger sets are controlled by seat CPUs within a seat electronic unit. The seat CPUs are coupled together within a zone and to a zone bridge unit forming a bus structure, with each seat CPU forming a node on the bus structure. Preferably, this bus structure is an IEEE 1394 serial bus network. The zone bridge unit controls and routes communications between the seat CPUs and the headend of the system.

A wiring database, including each seat position within the aircraft, is maintained within a system manager unit. A topology map, including the device addresses of the nodes within the zone and their relationship to each other, is generated during a self-ID sequence and is maintained for each zone by the zone bridge unit. This information is then compared to the wiring database by the system manager unit in order to build a restored topology map which includes the corresponding device address for each device at each seat position. A dynamic host configuration protocol (DHCP) database is then generated which includes each device address and its corresponding network protocol address. The network protocol address corresponds to the seat position of the respective device. Using this DHCP database, each seat CPU can then determine the network protocol address for the seat position where the seat CPU has been installed. This network protocol address is obtained by the seat CPUs from the DHCP database at boot time.

In an alternate embodiment of the present invention, this DHCP database is then combined with a passenger list to build a passenger database. The passenger database is updated for each flight to also include the appropriate passenger list and each passenger's assigned seat. Personalized messages can then be sent to each passenger and usage of the system by each passenger can also be tracked by the system. This passenger database can also be displayed for use by both attendant and maintenance personnel in order to configure the network for specific use patterns and maintain and monitor the network.

DETAILED DESCRIPTION OF THE PREFERRED EMBODIMENT

Figure 1:
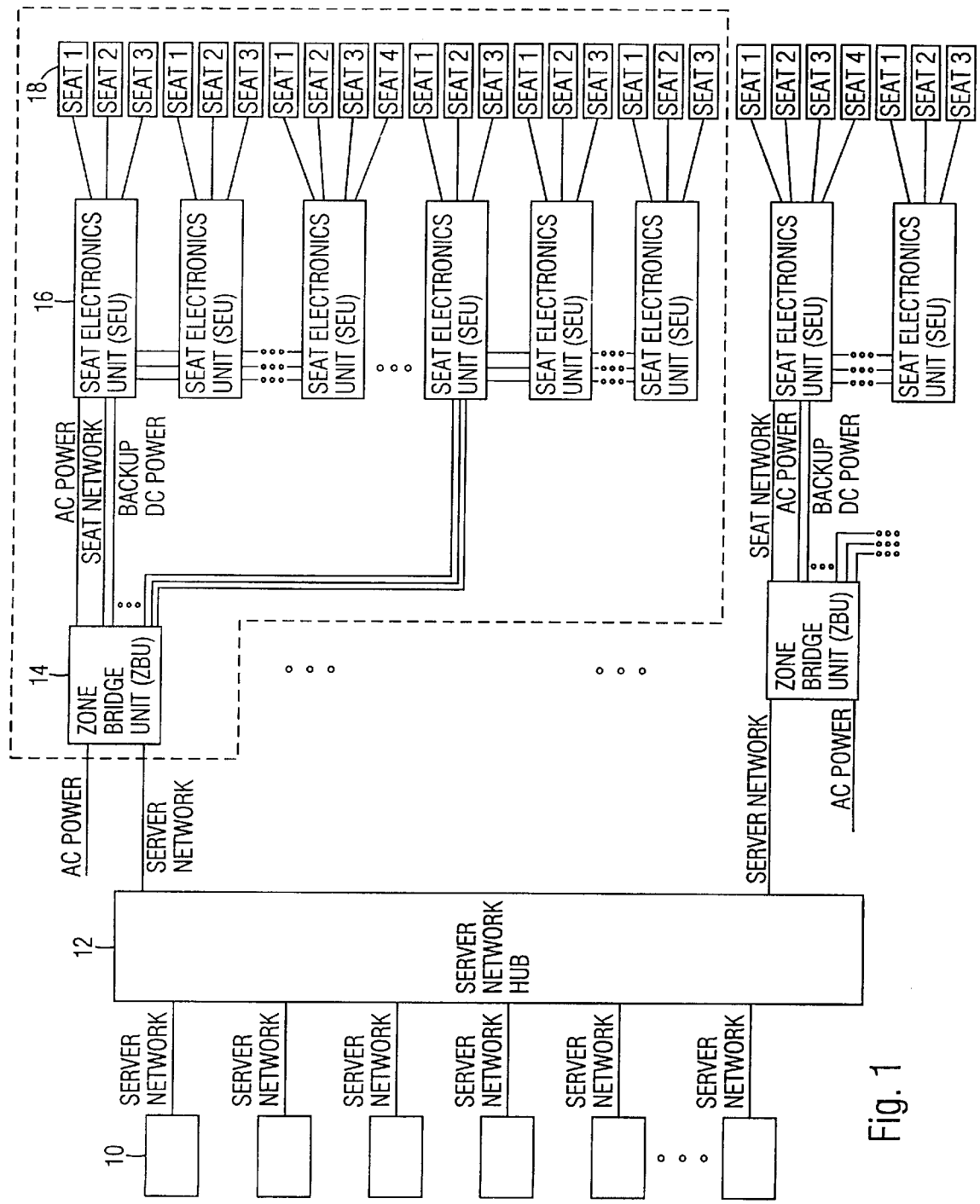
FIG. 1 illustrates a block diagram of an overall in-flight entertainment system in which the preferred embodiment of the present invention is implemented.

The preferred embodiment of the present invention is implemented within an in-flight entertainment system, as taught in U.S. Patent application Ser. No. 08/714,772, filed on Sep. 16, 1996, and entitled "Combined Digital Audio/ Video On Demand And Broadcast Distribution System," which is hereby incorporated by reference. A block diagram of this overall in-flight entertainment system is illustrated in FIG. 1. Within a headend of this system, one or more servers 10 are coupled to a server network hub 12. The headend of this system includes a data server, a media controller, one or more media servers, a system manager unit and an attendant control panel. Coupled to the server network hub 12 are one or more zone bridge units 14. The server network hub 12 is preferably an ATM switch which routes communications between the servers 10 and the zone bridge units 14. Each zone bridge unit 14 is coupled to one or more seat electronics units 16. Seat central processing units (CPUs) within the seat electronics units 16 are coupled to control passenger control sets of seat peripherals 18. Each seat electronics unit 16 preferably includes a number of seat CPUs for controlling a number of passenger control sets of seat peripherals 18. The zone bridge units 14 and the seat electronics units 16 are preferably coupled together by an IEEE 1394 serial bus network. Each seat CPU provides a node on the bus structure and controls local applications at the passenger control sets 18. Through the passenger control sets 18, a passenger has access to one or more services such as audio and video on demand, video games, gambling, telephone service and information services. Each passenger control set of seat peripherals 18 includes a set of peripherals which allow the passenger to access the features and services available through the system. Preferably, each passenger control set 18 includes a seat video display, a passenger control unit and a passenger control handset, which are coupled for sending communications to and receiving communications from the corresponding seat CPU. The passenger control units are mechanically stored within the seats of the aircraft, such that when a seat is replaced, the passenger control unit is also replaced. The seat electronics units can also be replaced or reconfigured during maintenance or reconfiguration of the aircraft.

An automatic configuration system according to the present invention is used to map a device or media access control (MAC) address of each passenger control unit within an aircraft to the physical location or seat position of the passenger control unit within the aircraft. Using this automatic configuration system, a configuration database is built and stored within the system manager unit. The configuration database maps the MAC address to a network protocol address. The system manager unit in connection with a dynamic host configuration protocol (DHCP) server within the headend of the system is used to build this configuration database. Using this DHCP database, each seat CPU can then determine the network protocol address for the seat position where the seat CPU has been installed. At boot time, each seat CPU then obtains its corresponding network protocol address using this configuration database.

Preferably, each seat CPU has a unique MAC address which is saved within a ROM inside the seat CPU corresponding to the passenger control unit. Alternatively, the unique MAC address is saved within a memory device inside any other appropriate piece of equipment, including the passenger control set of seat peripherals 18. In a further alternate embodiment, the unique MAC address is saved within any other appropriate memory device including an EEPROM, EPROM or flash memory device. For communications over the network between the headend and the passenger control sets, a transmission control protocol (TCP)/Internet Protocol (IP) or network protocol address is preferably used. When building the configuration database, the system manager unit maps each seat CPU, using its MAC address, to a corresponding IP address. The IP address is mapped to a seat location or position within the aircraft and is used to identify the passenger control units for communications using TCP/IP.

Figure 2:
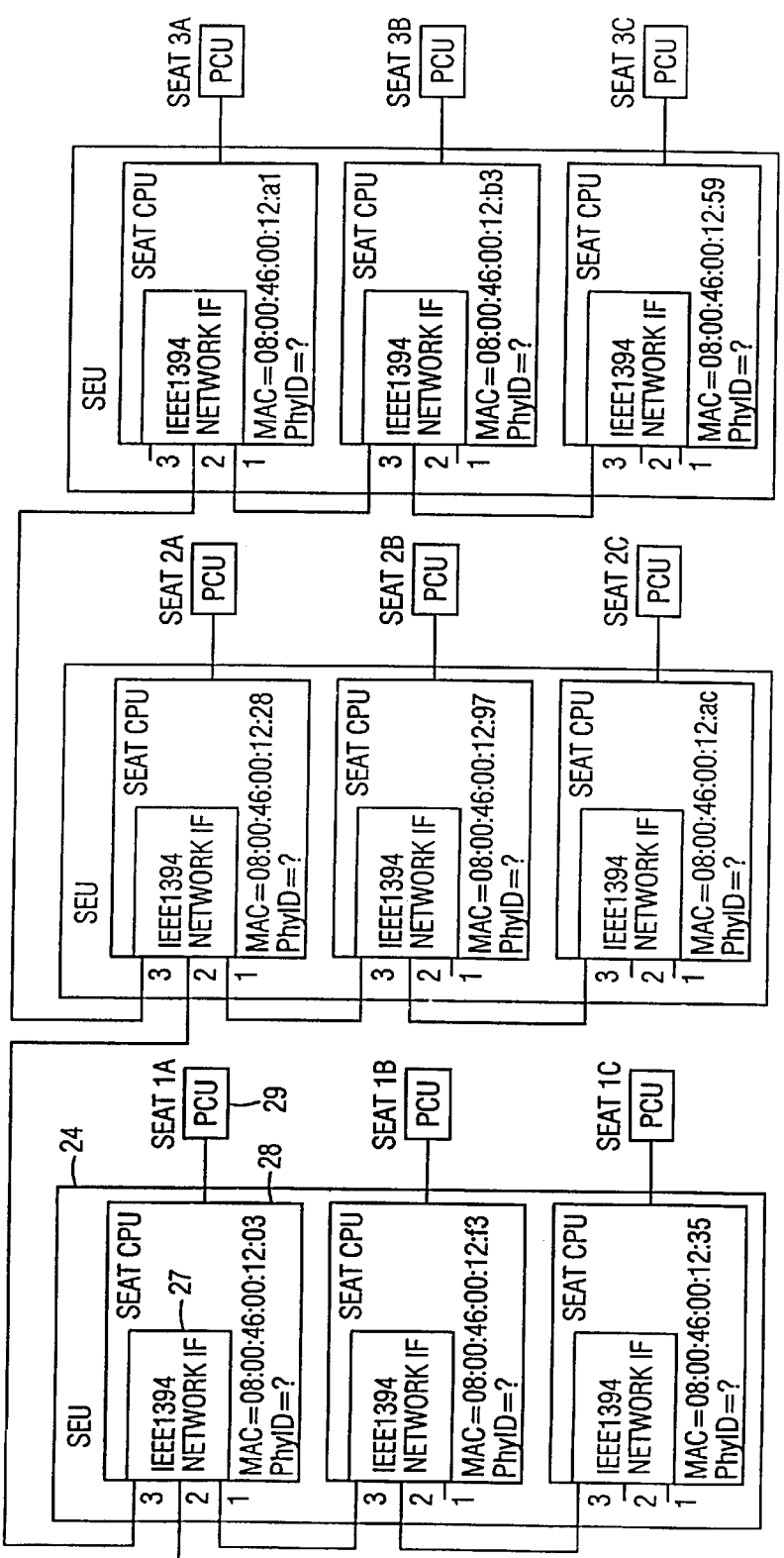
FIG. 2 illustrates a block diagram of the components within a zone of an aircraft.

A block diagram of the components within a zone of an aircraft is illustrated in FIG. 2. A zone bridge unit 20 includes an IEEE 1394 network interface 22 through which communications over an IEEE 1394 serial bus network 26 are routed. A number of seat electronics units 24 are coupled to the network interface 22 by the bus structure 26. Each seat electronics unit 24 includes a number of seat CPUs 28, each coupled to a corresponding passenger control unit 29. Each seat CPU 28 includes an IEEE 1394 network interface 27 through which communications over the IEEE 1394 serial bus network 26, between the seat CPUs 28 and the zone bridge unit 20, are routed. Each seat CPU 28 also includes a unique MAC address. If a seat CPU 28 and corresponding passenger control unit 29 are replaced, the new seat CPU 28 will have a different MAC address. The zone bridge unit 20 is coupled to an ATM switch 12 (FIG. 1) for controlling and routing communications between the seat CPUs 28 and the headend of the in-flight entertainment system. Each passenger control unit 29 corresponds to a seat position within the aircraft.

Figure 3:
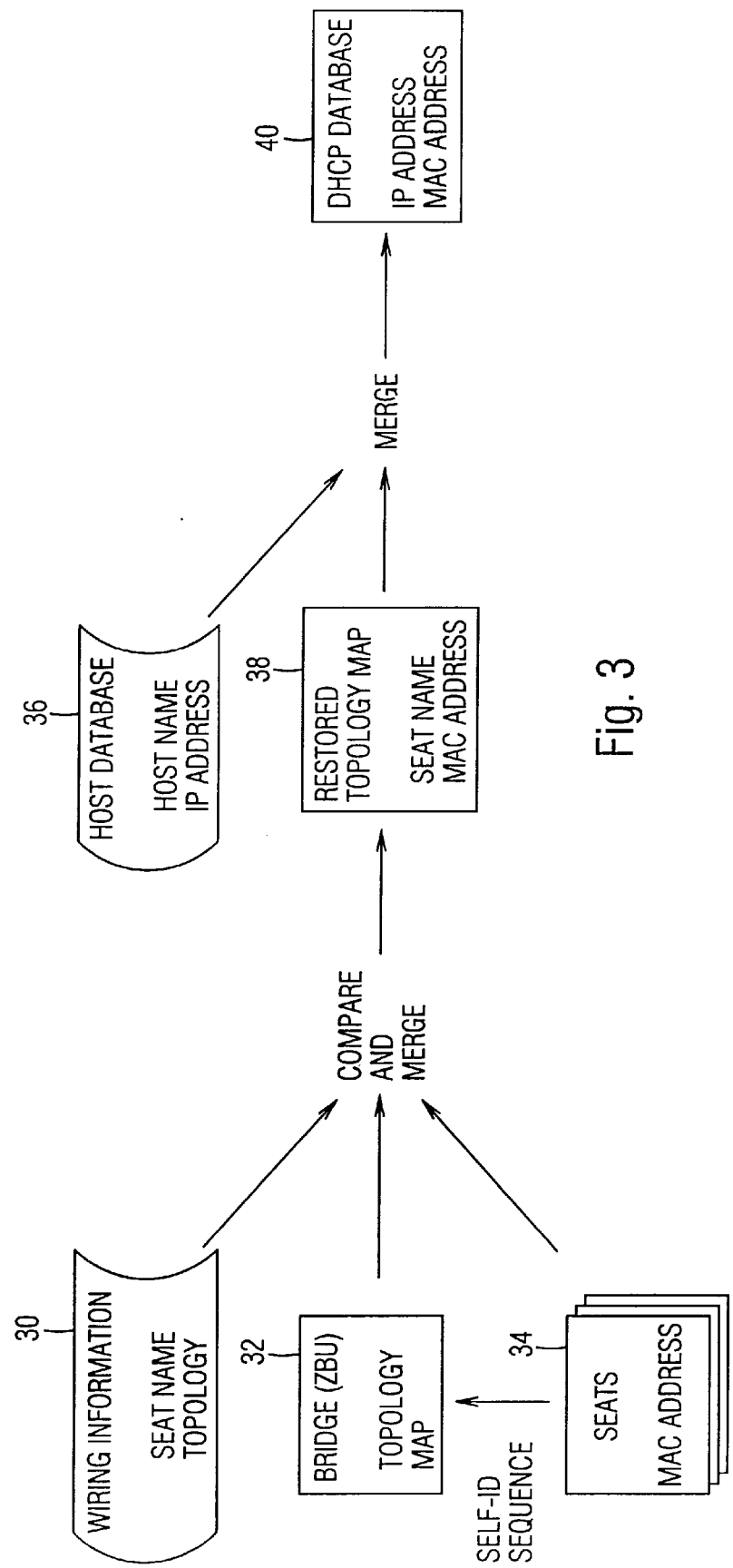
FIG. 3 illustrates a flow diagram showing the flow and the steps included in generating a configuration database of the present invention.

A flow diagram showing the flow and the steps included in generating a configuration database of the present invention is illustrated in FIG. 3. A wiring database 30 is generated when the system is designed and incorporated into an aircraft. Once the system is implemented within the aircraft, the wiring database for each zone is loaded within the system manager unit. The wiring database includes a wiring map of the seat numbers within each of the zones and their relationship to each other and to the zone bridge unit 20. The wiring database also includes the correlation between the seat position and the port of the seat CPU 28. The seat CPU 28 corresponds to a passenger control unit 29 which corresponds to a seat position. The wiring database for the zone illustrated within FIG. 2 includes seat numbers 1A–1C, 2A–2C and 3A–3C.

Each zone bridge unit 20 builds a topology map 32 using the self-ID sequence of the IEEE 1394 serial bus protocol. This self-ID sequence determines the physical topology of the nodes on the IEEE 1394 serial bus network due to their port connections. From each port it is determined if there is a connection and if the connection is to a child or parent node. During this self-ID sequence, all of the physical connections are assigned a direction pointing towards the root node. The zone bridge unit 20 is preferably configured as the root node within each zone. The direction is set by labeling each connected port as either a parent port or a child port. A parent port is a port connected to a node closer to the root than the reporting node. A child port is a port connected to a node further from the root than the reporting node. From these relationships, the zone bridge unit 20, as the root node, can determine the physical topology of the devices connected to the IEEE 1394 serial bus network within its zone.

Once the zone bridge unit 20 builds the topology map 32, it then obtains the MAC addresses 34 from each of the seat CPUs 28 within the zone and includes the MAC addresses 34 within the topology map 32. Once built, this topology map 32 includes the physical topology of the devices connected to the IEEE 1394 serial bus network within the zone and the corresponding MAC address of those devices.

This topology map 32 is then compared to the wiring database 30 and a restored topology map 38 is generated which includes each seat position and a corresponding MAC address of the seat CPU 28 at that seat position. The restored topology map 38 for each zone is generated by the system manager unit. A host database 36 includes a host name and a corresponding IP address. The host name is the name assigned to the respective device corresponding to the IP address. For example, in the preferred embodiment the host name for the seat CPUs is a combination of the word "SEAT" and the position of the seat; e.g. "SEAT1A." The host database is also generated when the system is designed and incorporated into an aircraft. The host database is also stored within the system manager unit. The host database 36 is then merged with the restored topology map 38 to generate a DHCP database 40 which maps the IP address of each seat position to the MAC address of the seat CPU 28 at that seat position.

In order to maintain the DHCP database, the system manager unit will preferably perform this configuration method when triggered under maintenance mode, when the seat configuration is changed or a seat CPU 28 is replaced. Alternatively, as should be apparent to those skilled in the art, the DHCP database can be automatically updated on a periodic basis or after a predetermined event. Within the preferred embodiment of the present invention, the DHCP database is only updated when manually triggered or initiated during maintenance of the aircraft, when a seat electronics unit is replaced or an airplane is reconfigured.

Figure 4:
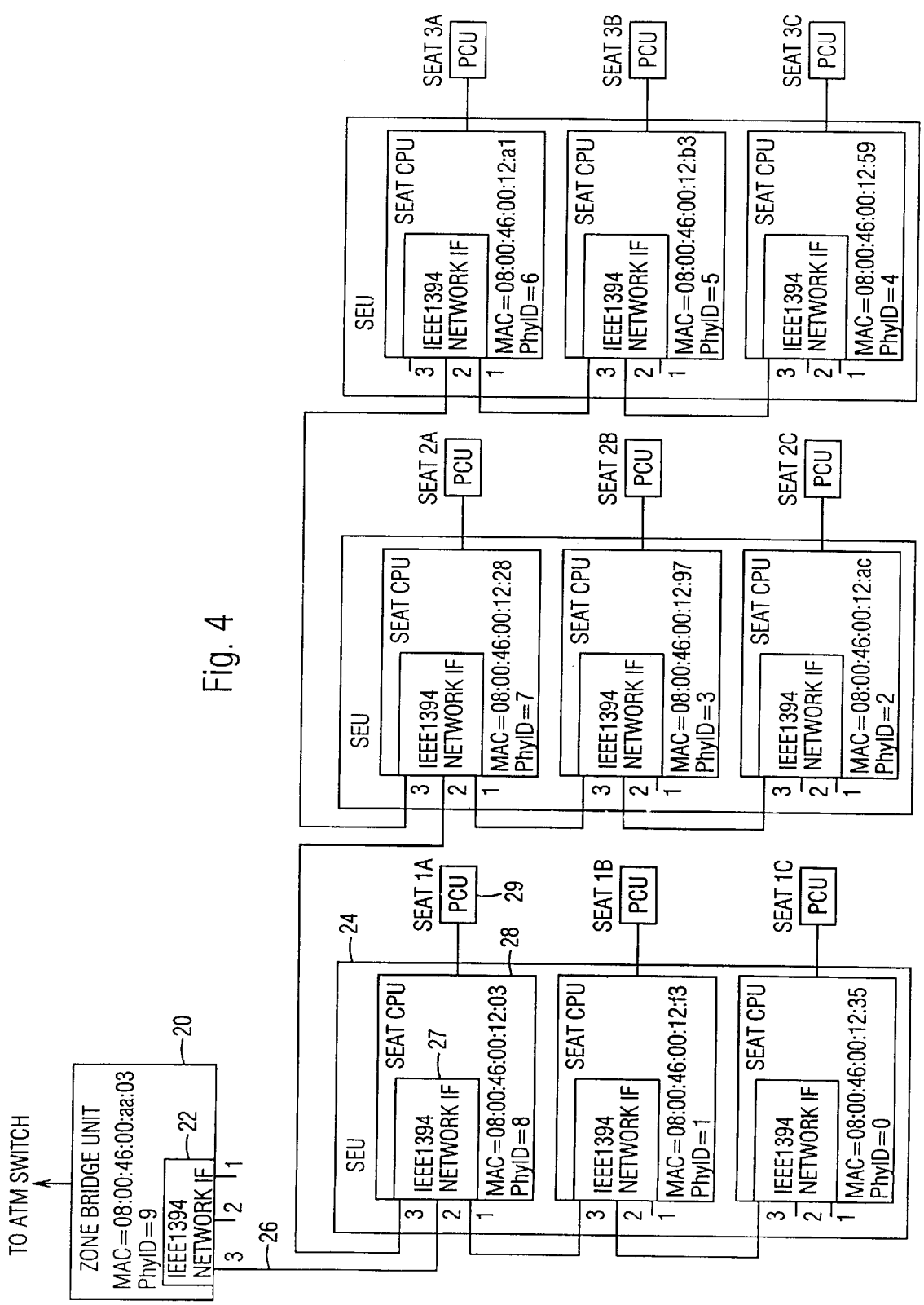
FIG. 4 illustrates an example of the zone of FIG. 2 after a self-ID sequence has been run.

The zone illustrated in FIG. 2 will be used as an example to describe the methods used to generate the configuration database of the preferred embodiment of the present invention. Each seat CPU 28 within the zone includes a unique MAC address. During the self-ID sequence, the zone bridge unit 20 generates the topology map 32 and assigns a physical ID to each seat CPU 28. An example of the zone after the self-ID sequence has been run is illustrated in FIG. 4. As illustrated in FIG. 4, the seat CPUs 28 have all been assigned a physical ID.

After the self-ID sequence is run, the zone bridge unit 20 generates the topology map 32, which is illustrated below, within Table 1.

TABLE 1

Zone Topology Map

| Length | CRC |
|---|---|
| node_count = 10 | self_id_count = 10 |
| Self ID Packet #0: NNP | |
| Self ID Packet #1: NCP | |
| Self ID Packet #2: NNP | |
| Self ID Packet #3: NCP | |
| Self ID Packet #4: NNP | |
| Self ID Packet #5: NCP | |
| Self ID Packet #6: CPN | |
| Self ID Packet #7: CPC | |
| Self ID Packet #8: CPC | |
| Self ID Packet #9: NNC | |

This topology map is built and stored by the zone bridge unit 20. The node_count value is equal to the number of nodes within the zone. In this example, the node_count value is equal to ten, including the nine seat CPUs 28 and the zone bridge unit 20. The self_id_count value is equal to the number of self-ID packets that are received by the zone bridge unit 20 during the self-ID sequence. In this example, the self_id_count value is equal to ten, because all of the nodes within the zone are operational and reported their self-ID packets to the zone bridge unit 20. If a node is not operational when the self-ID sequence is run, the physical layer of the node will still send a self-ID packet to the zone bridge unit 20. The physical layer of the node will not send a self-ID packet to the zone bridge unit 20 only in extreme circumstances, such as if the node transceiver is broken or if the cable is bad.

The topology map, illustrated in Table 1, includes the self-ID packets from each of the nodes within the zone. Each IEEE 1394 self-ID packet includes more information than is shown in Table 1. Only the information relevant to the operation of the present invention is shown within the self-ID packets listed in Table 1. The information shown within the topology map of Table 1 includes the port status of each operational node within the zone. The self-ID packets within Table 1 each include a number which corresponds to the physical ID of the node which sent the particular self-ID packet. The last three letters within a self-ID packet correspond to the port connections of the corresponding node: if the port is not connected to another port, a value N for that port is reported; if the port is connected to a child node, a value C for that port is reported; and if the port is connected to a parent node, a value P for that port is reported. The last three letters within the self-ID packets are arranged to correspond to the order of the ports within each node, as numbered within the FIG. 4. In this example, each node includes three ports.

The self-ID packet for the node having a physical ID equal to zero, which corresponds to the seat position 1C, includes port status information equal to NNP. As illustrated in FIG. 4, ports 1 and 2 of this seat CPU are not connected and port 3 is connected to a parent port. The remaining self-ID packets within Table 1, represent the port connections of the corresponding seat CPUs within the zone illustrated in FIG. 4.

Figure 5:
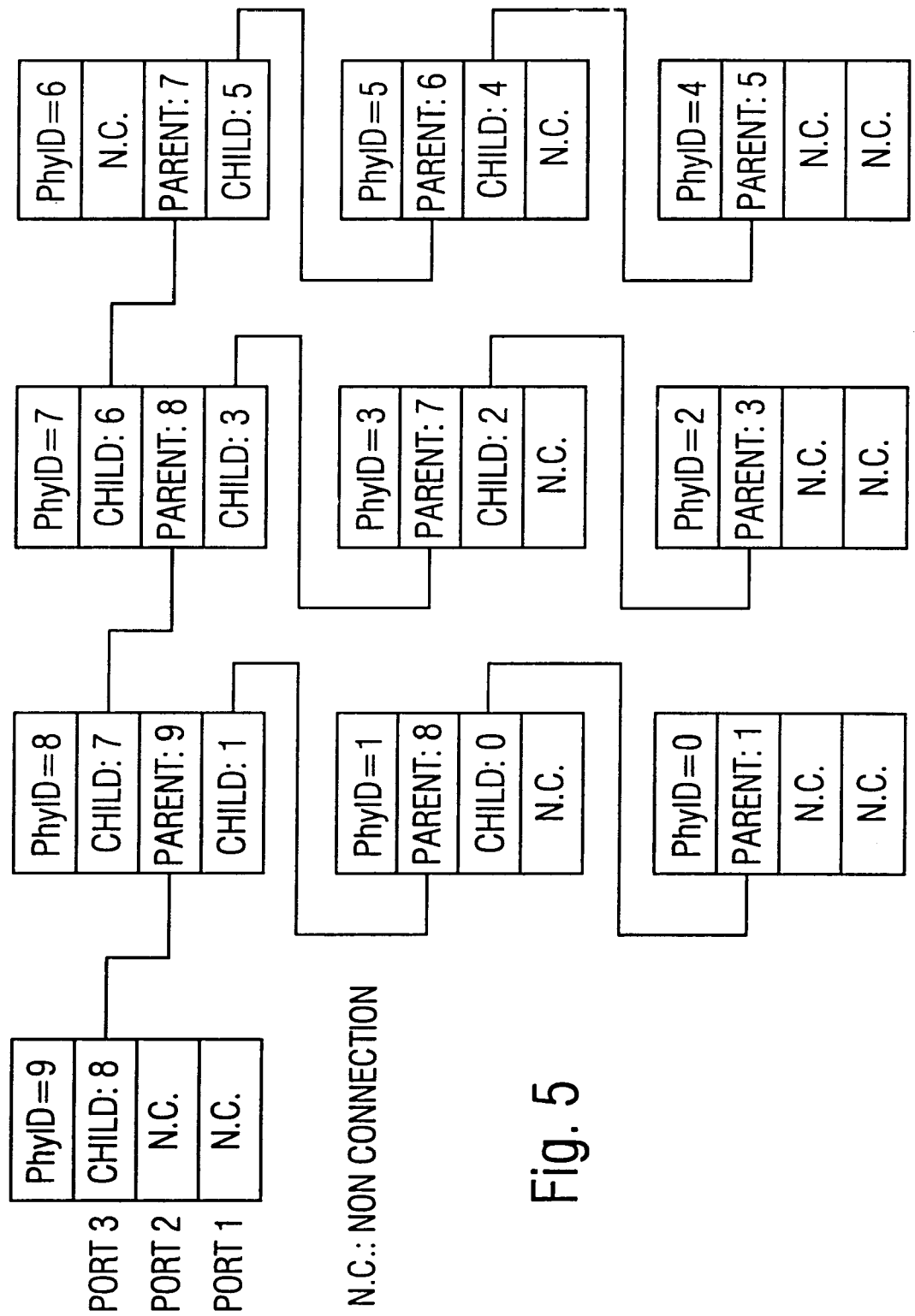
FIG. 5 illustrates a topology link list for the zone of FIG. 2.

Once the zone bridge unit 20 generates the topology map of Table 1, the system manager unit then creates a topology link list as illustrated in FIG. 5. The system manager unit retrieves the topology map from the zone bridge unit 20 and creates the topology link list by processing the self-ID packets from the zone bridge unit 20. The system manager unit processes the last received self-ID packet, which has a physical ID equal to 9 and corresponds to the zone bridge unit 20, and then processes the remaining self-ID packets in the reverse order from which they were received until the first received self-ID packet, which has a physical ID equal to 0 and corresponds to the seat CPU at the seat position IC is processed. By processing the self-ID packets in this order, the system manager unit will generate the topology link list illustrated in FIG. 5.

Figure 6:
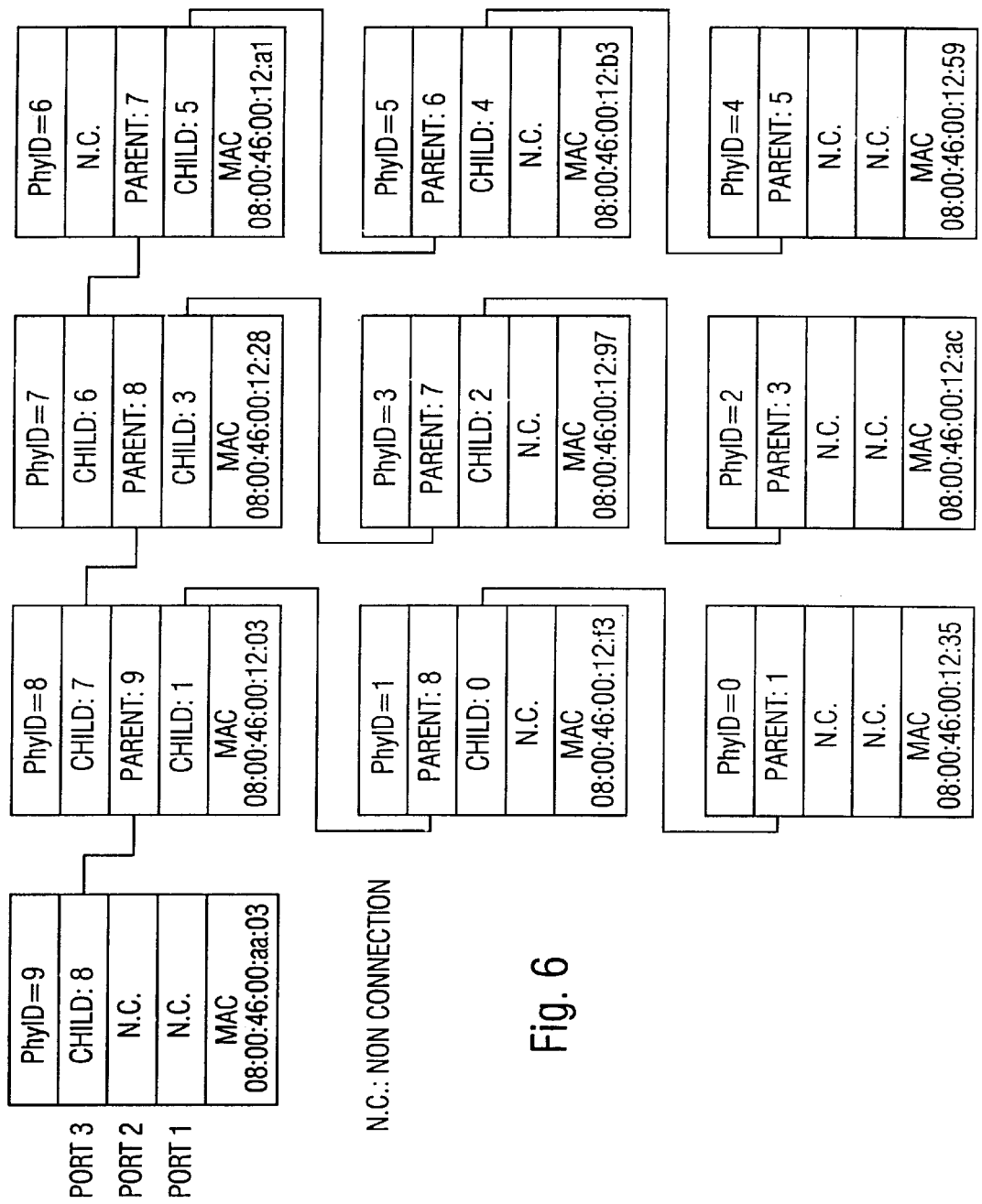
FIG. 6 illustrates a topology link list for the zone of FIG. 2, including MAC addresses for the devices within the zone.

The system manager unit then reads the MAC addresses of each of the nodes within the zone and adds the MAC addresses to the topology link list. The MAC addresses are read by the system manager unit through the zone bridge unit. The topology link list including the MAC addresses is illustrated in FIG. 6.

Figure 7:
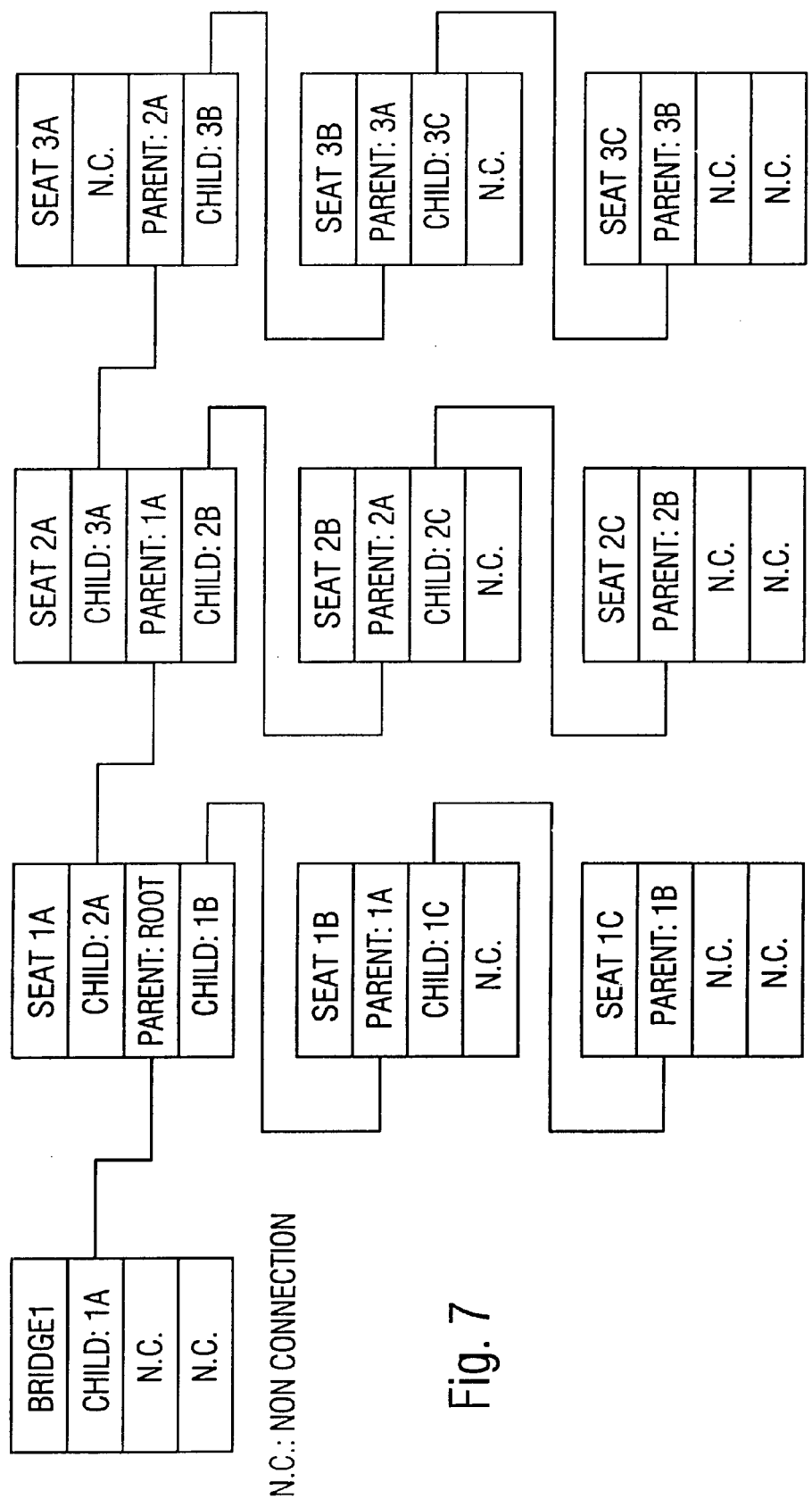
FIG. 7 illustrates a wiring database for the zone of FIG. 2.

The wiring database 30 stored within the system manager unit, is illustrated in FIG. 7. This wiring database 30 includes the component position for the zone bridge unit and the seats within the zone, with a map of the design for those components. As described above, this wiring database 30 is prepared by the system designer and entered into the system manager unit when the aircraft is designed and the system is implemented.

Figure 8:
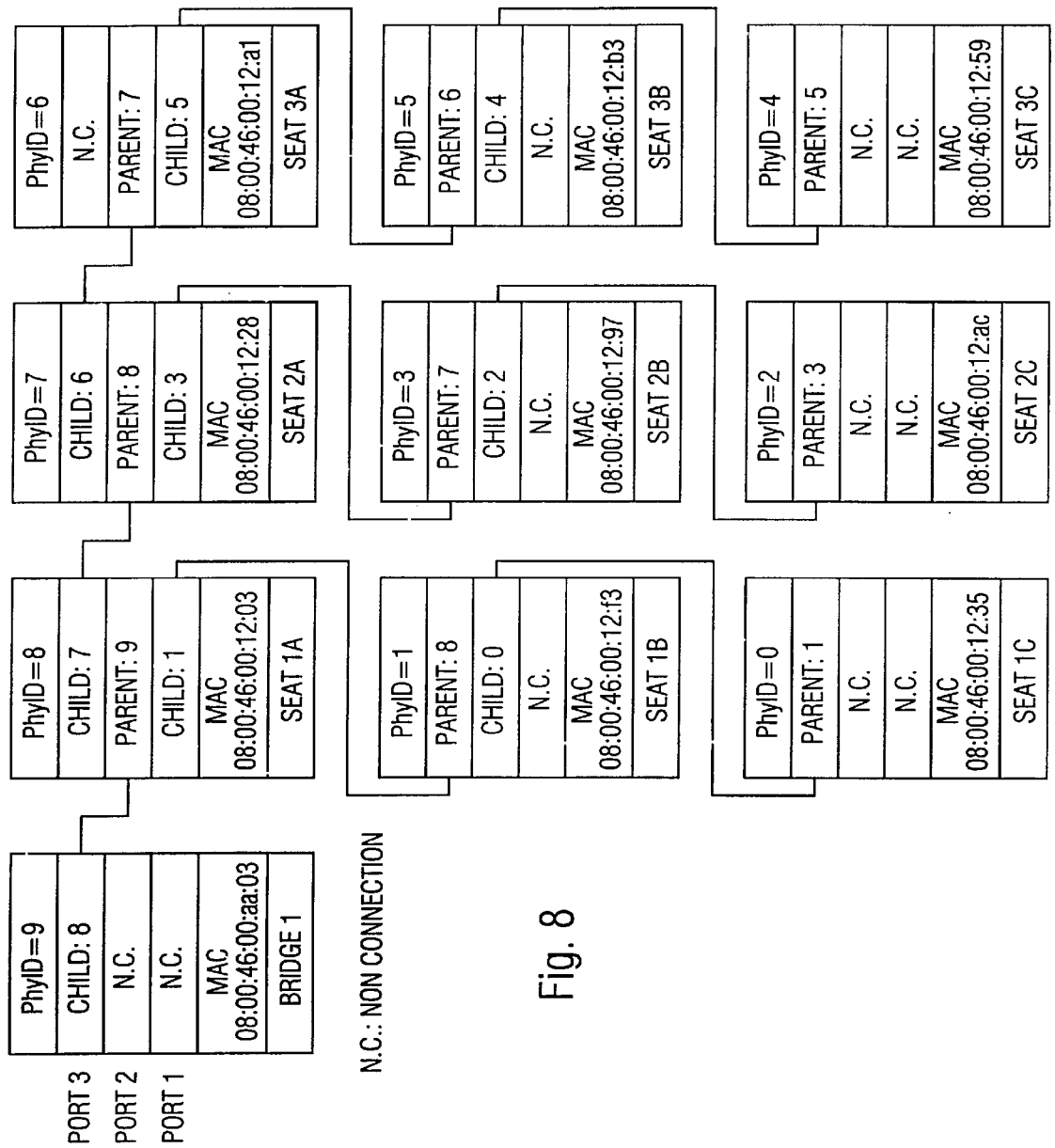
FIG. 8 illustrates a restored topology map for the zone of FIG. 2.

The system manager unit compares the topology link list 32, including the MAC addresses, with the wiring database 30 to obtain the restored topology map 38, as illustrated in FIG. 8. This restored topology map includes the information from the topology link list and the corresponding position for each node, including the seats and the zone bridge unit. The restored topology map 38 therefore will include the physical ID for each node, the representative port information for the ports of each node, the MAC address and the corresponding position within the aircraft for each node.

The host database 36 for the zone of FIG. 4, is illustrated below within Table 2.

TABLE 2

| HOST DATABASE | |
| --- | --- |
| IP ADDRESS | HOST NAME |
| 10.0.0.8 | BRIDGE1 |
| 10.0.0.10 | SEAT1A |

TABLE 2-continued

| HOST DATABASE | |
| --- | --- |
| IP ADDRESS | HOST NAME |
| 10.0.0.11 | SEAT1B |
| 10.0.0.12 | SEAT1C |
| 10.0.0.13 | SEAT2A |
| 10.0.0.14 | SEAT2B |
| 10.0.0.15 | SEAT2C |
| 10.0.0.16 | SEAT3A |
| 10.0.0.17 | SEAT3B |
| 10.0.0.18 | SEAT3C |

The host database illustrated within Table 2 is prepared by the system designer and entered into the system manager unit when the system is designed and implemented on an aircraft. The host database is independent of the wiring database. The host database combines the host name or position of the node with the IP or network protocol address of that position. This IP address is therefore consistent for the position within the aircraft, independent of the actual device or component that is located at that position.

Figure 9:
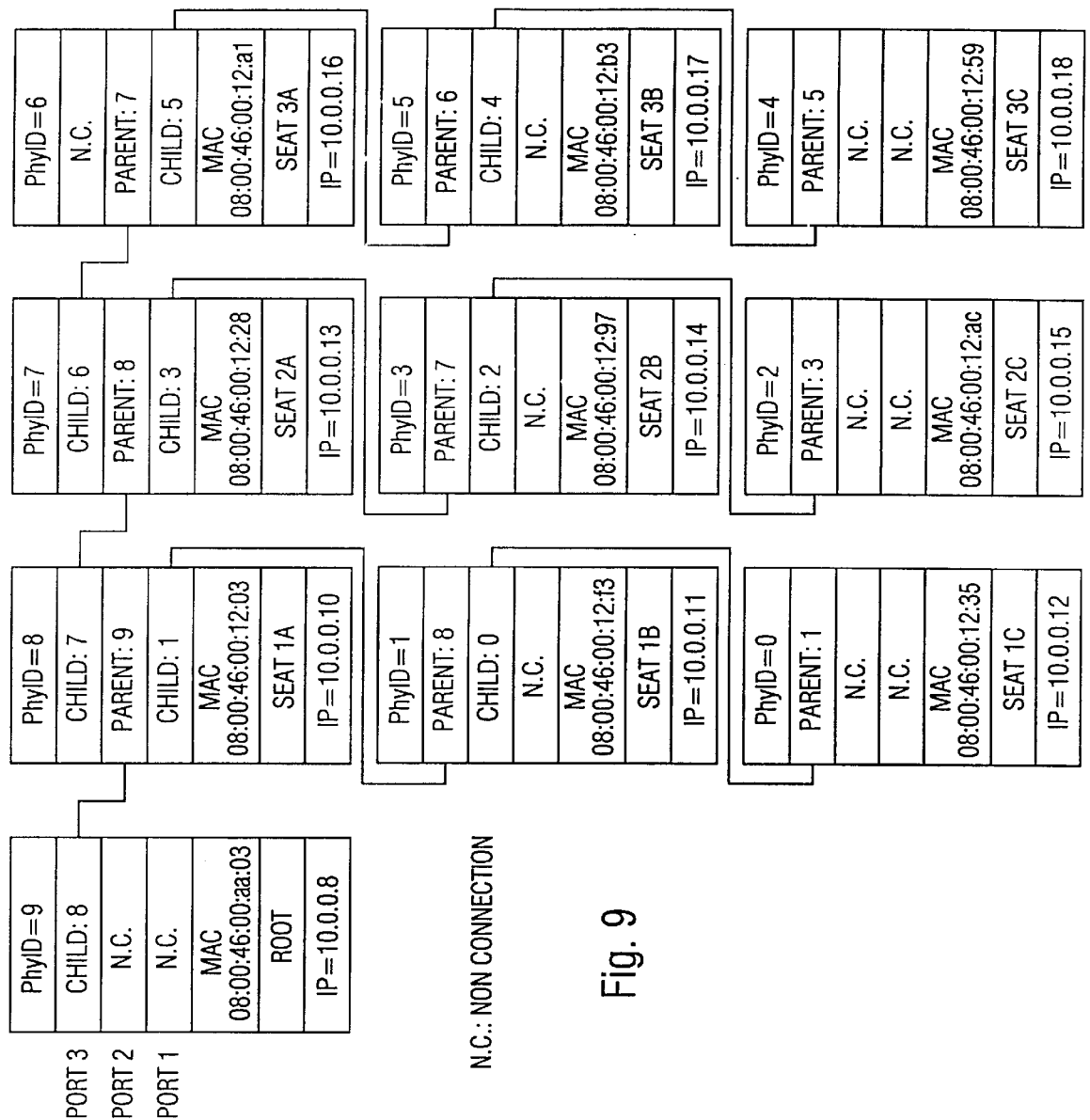
FIG. 9 illustrates a restored topology link list for the zone of FIG. 2, including the IP address for the devices within the zone.

After the restored topology map 38 is generated, the system manager unit combines the restored topology map 38 and the host database 36 to generate the DHCP database 40. The system manager unit first generates a restored topology link list which includes the IP address, as illustrated in FIG. 9. From this restored topology link list, the system manager unit then generates the DHCP database 40, which is illustrated in Table 3 below and includes only the IP address and the corresponding MAC address for each node within the zone.

TABLE 3

| DHCP DATABASE | |
| --- | --- |
| IP ADDRESS | MAC ADDRESS |
| 10.0.0.8 | 08:0046:00:aa:03 |
| 10.0.0.10 | 08:0646:00:12:03 |
| 10.0.0.11 | 08:0046:00:12:f3 |
| 10.0.0.12 | 08:0046:00:12:35 |
| 10.0.0.13 | 08:0046:00:12:28 |
| 10.0.0.14 | 08:0046:00:12:97 |
| 10.0.0.15 | 08:0046:00:12:ac |
| 10.0.0.16 | 08:0046:00:12:a1 |
| 10.0.0.17 | 08:0046:00:12:b3 |
| 10.0.0.18 | 08:0046:00:12:59 |

This DHCP database is then utilized to coordinate the proper IP address with the corresponding component's MAC address. The IP address corresponds to a particular seat position within the aircraft within the host database of Table 2. Accordingly, in order to access a particular seat CPU at a specific seat position, the system manager unit uses the IP address corresponding to that seat position to determine the appropriate corresponding MAC address for the seat CPU at that seat position. In this same manner, usage and other appropriate information can be tracked to a seat position using the corresponding MAC address of the communicating device.

When a seat which includes a passenger control unit is replaced, the system will perform the automatic configuration method of FIG. 3 to update the configuration database with the new MAC address of the seat CPU corresponding to the IP address at the seat position. When a seat electronics unit is removed or replaced within the IEEE 1394 serial bus network, the system manager unit will be instructed to automatically update the configuration database by performing the method described above as part of the maintenance routine. During this update, the zone bridge unit will have to run the self-ID sequence to obtain the topology map and MAC addresses for the components within the zone.

In an alternate embodiment of the present invention, application software will combine the DHCP database with a passenger list for each flight, thereby allowing the application to address a specific passenger through a passenger set of seat peripherals at a specific seat within the aircraft. This passenger list for each flight can be provided at an attendant control station or via any other appropriate links to the in-flight entertainment system. Greetings, messages and available features can then be tailored specifically to each passenger. In this alternate embodiment, the passenger list and corresponding seat position for each flight are loaded into the system from the airline's database. This passenger information includes the passenger's name, the seat to which the passenger is assigned and the passenger's previous use patterns on the in-flight entertainment system. Thus a passenger can be advised for example regarding a list of in-flight movies previously seen, music listened to, and the like. Using this passenger database, the system is able to send personalized communications to the passenger by addressing the communications to the network protocol address corresponding to the seat CPU controlling the passenger control unit at the passenger's seat. Using the passenger database, the system is also able to block service or types of services to particular seat CPUs or particular passengers. When receiving communications from the seat CPU, the system can also determine which passenger is requesting which information, using the passenger database. A passenger's activity on the in-flight entertainment system is thereby tracked so that available features on future flights can be tailored to that passenger's previous requests. Using this passenger database also maximizes the ease of billing for services provided to a passenger. It is important to the airlines operating the system that the billing for services provided is easy and transparent. The passenger database can also be displayed at an attendant control station or a maintenance station. This display makes it easy for maintenance and attendant personnel to configure the network for specific use patterns, such as blocking service or types of services to particular devices, and to maintain and monitor the network.

In the manner as described above, a configuration database is automatically maintained. The configuration database includes each IP address, MAC address and corresponding seat position. A wiring database is entered into the system manager unit once the wiring of the aircraft has been designed. The wiring database includes the wiring pattern of each seat position on the aircraft. This wiring database is then compared to a topology map which includes the MAC addresses of each component and the relationship of the components within the zone is received from each zone bridge unit for generating a restored topology map. The restored topology map is compared to a host database, which includes an IP or network protocol address corresponding to each seat position, to generate a DHCP database, which maps each IP address to a corresponding MAC address. Using this DHCP database, each seat CPU can then determine at boot time the network protocol address for the seat position where the seat CPU has been installed.

Without the automatic configuration system of the present invention, a configuration database would have to be manually maintained and updated after installation of the system and when any passenger control unit within an aircraft is replaced. This type of manual method is labor intensive and will be subject to human error.

In an alternative embodiment, the seat position may be saved on each seat CPU. In this alternate embodiment, the seat position is manually entered at each passenger set of seat peripherals, after the seat electronics unit is connected to the IEEE 1394 bus structure. The system manager unit will then query each seat CPU, over the IEEE 1394 bus structure, to compile the configuration database.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For example, while an ATM network and IEEE 1394 serial bus network have been chosen for use within the preferred embodiment, it will be apparent that the automatic configuration system and method of the present invention can be used within other types of networks in other types of environments including but not limited to home, office, computer center, school and hospital. It will also be apparent that the entertainment system of the preferred embodiment of the present invention can also be readily adapted for operation in environments other than aircraft, including but not limited to other transportation modes, e.g. train, bus, ferry and cruise ship. It will be apparent that the automatic configuration system of the present invention can be easily adapted for use in other types of networks and in other environments than those specifically described herein.

We claim:

1. A method of automatically mapping device addresses to physical locations of devices within a bus structure corresponding to the device addresses, comprising the steps of:
   a. maintaining a wiring database including wiring diagram and physical locations of devices;
   b. maintaining a topology map representing device addresses of devices coupled to the bus structure; and
   c. comparing the wiring database to the topology map and matching device addresses of devices coupled to the bus structure to physical locations of devices.

2. The method as claimed in claim 1 wherein each device address is unique and further wherein when an existing device is replaced by a new device, the device address of the new device is different than the device address of the existing device.

3. The method as claimed in claim 1 further comprising the step of forming a configuration database including physical locations and corresponding device addresses.

4. The method as claimed in claim 3 further comprising the step of matching the device addresses to network protocol addresses corresponding to physical locations of devices.

5. The method as claimed in claim 1 wherein the bus structure is an IEEE 1394 serial bus network.

6. The method as claimed in claim 5 wherein the step of maintaining the topology map further comprises automatically generating the topology map during a self-ID sequence of IEEE 1394 protocol.

7. The method as claimed in claim 1 wherein the method is implemented within an in-flight entertainment system for use on board an aircraft.

8. The method as claimed in claim 7 wherein the devices are seat CPUs coupled to control passenger sets of seat peripherals through which passengers have access to the in-flight entertainment system.

9. The method as claimed in claim 8 wherein the wiring database is entered into and maintained by a system manager unit within a headend of the system.

10. The method as claimed in claim 9 wherein the topology map is automatically generated for a zone within the aircraft by a zone bridge unit coupled to one or more seat electronics units, wherein each seat electronics unit includes one or more seat CPUs.

11. The method as claimed in claim 10 wherein the method of automatically mapping is performed only when manually triggered during a maintenance cycle.

12. The method as claimed in claim 11 further comprising the step of updating the configuration database to include passenger information for each flight of the aircraft.

13. An apparatus for automatically mapping device addresses within a bus structure to corresponding physical locations of devices, comprising:
   a. a plurality of devices coupled together to form a bus structure;
   b. a network interface coupled to the bus structure and configured for controlling communications to and from the plurality of devices and for maintaining a topology map representing device addresses of each of the plurality of devices; and
   c. a system controller coupled to the network interface for monitoring operation of the plurality of devices, wherein the system controller is configured for maintaining a system wiring database including a wiring diagram and physical locations of the plurality of devices and further wherein the system controller is configured for comparing the wiring database to the topology map and forming a restored topology map by matching the device addresses to a corresponding one of the physical locations of the plurality of devices.

14. The apparatus as claimed in claim 13 further comprising a display for displaying the restored topology map.

15. The apparatus as claimed in claim 13 wherein each of the plurality of devices has a corresponding unique device address and further wherein when an existing device is replaced by a new device at a physical location, the device address of the new device is different than the device address of the existing device.

16. The apparatus as claimed in claim 15 wherein the bus structure is an IEEE 1394 serial bus network.

17. The apparatus as claimed in claim 16 wherein the network interface automatically generates the topology map during self-ID sequence of IEEE 1394 protocol.

18. The apparatus as claimed in claim 13 wherein the apparatus is part of an in-flight entertainment system for use on board an aircraft and each device is a passenger control unit through which a passenger has access to the in-flight entertainment system.

19. The apparatus as claimed in claim 13 wherein the system controller further maintains a host database representing network protocol addresses of the physical locations and compares the host database to the restored topology map to form a link list, listing each device address and corresponding network protocol address.

20. The apparatus as claimed in claim 18 wherein the restored topology map is updated for each flight of the aircraft to also include passenger information thereby forming a passenger configuration database.

21. The apparatus as claimed in claim 20 further comprising a display for displaying the passenger configuration database.

22. A method of automatically mapping device addresses to network protocol addresses of device locations within a bus structure, comprising the steps of:
   a. maintaining a wiring database in a first control computer including wiring diagram and physical locations of devices;
   b. maintaining a topology map in a second control computer representing device addresses of devices coupled to the bus structure;
   c. generating a restored topology map by combining the wiring database with the topology map to map device addresses to a corresponding physical location;
   d. maintaining a host database in the first control computer representing network protocol addresses of the physical locations of devices; and
   e. generating a network database by combining the host database and the restored topology map, wherein the network database includes network protocol addresses and corresponding device addresses.

23. The method as claimed in claim 22 wherein the restored topology map is generated within the first control computer.

24. The method as claimed in claim 22 wherein the network database is generated within the first control computer.

25. The method as claimed in claim 22 wherein each device address is unique and when an existing device is replaced by a new device, the device address of the new device is different than the device address of the existing device.

26. The method as claimed in claim 25 wherein the bus structure is an IEEE 1394 serial bus network.

27. The method as claimed in claim 26 wherein the topology map is automatically generated during a self-ID sequence of IEEE 1394 protocol.

28. The method as claimed in claim 22 wherein the method is implemented within an in-flight entertainment system for use on board an aircraft.

29. The method as claimed in claim 28 wherein the devices are seat CPUs coupled to control passenger sets of seat peripherals through which passengers access the in-flight entertainment system.

30. The method as claimed in claim 29 wherein the wiring database is entered into and maintained by a system manager unit within a headend of the system.

31. The method as claimed in claim 30 wherein the topology map is automatically generated for a zone within the aircraft by a zone bridge unit coupled to one or more seat electronics units, wherein each seat electronics unit includes one or more seat CPUs.

32. The method as claimed in claim 31 wherein the method of automatically mapping is performed only when manually triggered during a maintenance cycle.

33. The method as claimed in claim 32 further comprising the step of updating the configuration database to include passenger information for each flight of the aircraft.

34. The method as claimed in claim 33 further comprising the step of displaying a selected one of the network database and the configuration database.

35. An in-flight entertainment system comprising:
   a. one or more zones each including:
      i. a plurality of passenger control units, through which a passenger accesses the in-flight entertainment system;
      ii. a plurality of seat electronics units each including at least one seat CPU coupled to each other to form a bus structure, wherein each seat CPU is coupled to control a passenger set of seat peripherals, each seat CPU having a unique device address;

iii. a control unit coupled to the bus structure for controlling communications to and from the seat CPUs and for maintaining a topology map representing device addresses of each of the seat CPUs; and b. a system manager unit within a headend of the system, coupled to the control units for comparing the topology map to a wiring database, including a wiring diagram and physical locations of the seat CPUs, and forming a configuration database including device addresses and corresponding physical locations of seat CPUs.

36. The in-flight entertainment system as claimed in claim 35 wherein the physical locations are seat positions within the aircraft.

37. The in-flight entertainment system as claimed in claim 36 wherein the configuration database is updated for each flight of the aircraft to also include passenger information.

38. The in-flight entertainment system as claimed in claim 37 wherein the bus structure is an IEEE 1394 serial bus network.

39. The in-flight entertainment system as claimed in claim 38 wherein the topology map is automatically generated during a self-ID sequence of IEEE 1394 protocol.

40. The in-flight entertainment system as claimed in claim 39 wherein the control unit is a zone bridge unit.

41. An automatically configurable in-flight entertainment system comprising:

a. a plurality of passenger seat units, each configured as a passenger entertainment system;

b. an IEEE 1394 network for coupling the passenger seat units together;

c. a system manager unit coupled to the IEEE 1394 network for generating a topological map to correlate each of the passenger seat units to a location on the IEEE 1394 network and for generating a replacement topological map after a passenger seat unit is either moved, repaired and replaced; and d. a data input device coupled to the system manager configured to receive a collection of data regarding a passenger, one collection for each passenger, and for correlating each of the collection of data to a passenger seat unit.

42. The automatically configurable in-flight entertainment system as claimed in claim 41 wherein the system manager unit is coupled to the IEEE 1394 network through an ATM switch.

* * * * *